United States Patent
de la Iglesia

(10) Patent No.: US 8,402,246 B1
(45) Date of Patent: Mar. 19, 2013

(54) ALIGNMENT ADJUSTMENT IN A TIERED STORAGE SYSTEM

(75) Inventor: Erik de la Iglesia, Sunnyvale, CA (US)

(73) Assignee: Violin Memory, Inc., Mountain View, CA (US)

( * ) Notice: Subject to any disclaimer, the term of this patent is extended or adjusted under 35 U.S.C. 154(b) by 138 days.

(21) Appl. No.: 12/869,604

(22) Filed: Aug. 26, 2010

Related U.S. Application Data

(60) Provisional application No. 61/237,930, filed on Aug. 28, 2009.

(51) Int. Cl.
G06F 5/01 (2006.01)
G06F 12/04 (2006.01)

(52) U.S. Cl. . 711/201; 711/118; 711/165; 711/E12.019; 711/E12.056; 711/E12.088

(58) Field of Classification Search .................. 711/118, 711/165, 201, E12.019, E12.056, E12.088
See application file for complete search history.

(56) References Cited

U.S. PATENT DOCUMENTS

| | | | |
|---|---|---|---|
| 5,954,796 A | 9/1999 | McCarthy et al. | |
| 6,041,366 A | 3/2000 | Maddalozzo et al. | |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Arnan et al. | |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,110,359 B1 | 9/2006 | Acharya | |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 2002/0035655 A1 | 3/2002 | Finn et al. | |
| 2002/0175998 A1 | 11/2002 | Hoang | |
| 2002/0194434 A1 | 12/2002 | Kurasugi | |
| 2003/0012204 A1 | 1/2003 | Czeiger et al. | |
| 2003/0167327 A1 | 9/2003 | Baldwin et al. | |
| 2003/0177168 A1 | 9/2003 | Heitman et al. | |
| 2003/0210248 A1* | 11/2003 | Wyatt | 345/541 |
| 2004/0128363 A1 | 7/2004 | Yamagami et al. | |
| 2004/0146046 A1 | 7/2004 | Jo et al. | |
| 2004/0186945 A1 | 9/2004 | Jeter et al. | |
| 2004/0215923 A1* | 10/2004 | Royer, Jr. | 711/220 |
| 2005/0025075 A1 | 2/2005 | Dutt et al. | |
| 2005/0195736 A1 | 9/2005 | Matsuda | |
| 2006/0005074 A1 | 1/2006 | Yanai et al. | |
| 2006/0034302 A1 | 2/2006 | Peterson | |
| 2006/0053263 A1 | 3/2006 | Prahlad et al. | |
| 2006/0075191 A1 | 4/2006 | Lolayekar et al. | |
| 2006/0112232 A1 | 5/2006 | Zohar et al. | |

(Continued)

OTHER PUBLICATIONS

Rosenblum, Mendel and Ousterhout, John K., The LFS Storage Manager. Proceedings of the 1990 Summer Usenix. 1990 pp. 315-324.

(Continued)

*Primary Examiner* — Hal Schnee

(57) ABSTRACT

A storage proxy monitors storage access operations. Different address alignments are identified between the storage access operations and data blocks in a storage media. A dominant one of the address alignments is identified. Data blocks are mapped into the storage media to remove the dominant address alignment. An array of counters can be used to track the address alignments for different storage access sizes and the address alignment associated with the highest number of storage access operations is used as the dominant address alignment.

19 Claims, 8 Drawing Sheets

U.S. PATENT DOCUMENTS

| | | | |
|---|---|---|---|
| 2006/0212524 A1* | 9/2006 | Wu et al. | 709/206 |
| 2006/0218389 A1 | 9/2006 | Li et al. | |
| 2006/0277329 A1 | 12/2006 | Paulson et al. | |
| 2007/0050548 A1 | 3/2007 | Bali et al. | |
| 2007/0079105 A1* | 4/2007 | Thompson | 711/201 |
| 2007/0118710 A1 | 5/2007 | Yamakawa et al. | |
| 2007/0124407 A1 | 5/2007 | Weber et al. | |
| 2007/0192444 A1* | 8/2007 | Ackaouy et al. | 709/219 |
| 2007/0233700 A1 | 10/2007 | Tomonaga | |
| 2007/0283086 A1 | 12/2007 | Bates | |
| 2008/0028162 A1* | 1/2008 | Thompson | 711/154 |
| 2008/0098173 A1 | 4/2008 | Chidambaran et al. | |
| 2008/0104363 A1 | 5/2008 | Raj et al. | |
| 2008/0162864 A1 | 7/2008 | Sugumar et al. | |
| 2008/0215827 A1 | 9/2008 | Pepper | |
| 2008/0215834 A1 | 9/2008 | Dumitru et al. | |
| 2008/0250195 A1 | 10/2008 | Chow et al. | |
| 2008/0320269 A1 | 12/2008 | Houlihan et al. | |
| 2009/0006725 A1 | 1/2009 | Ito et al. | |
| 2009/0006745 A1 | 1/2009 | Cavallo et al. | |
| 2009/0034377 A1 | 2/2009 | English et al. | |
| 2009/0110000 A1 | 4/2009 | Brorup | |
| 2009/0240873 A1 | 9/2009 | Yu et al. | |
| 2009/0259800 A1 | 10/2009 | Kilzer et al. | |
| 2009/0262741 A1* | 10/2009 | Jungck et al. | 370/392 |
| 2009/0276588 A1 | 11/2009 | Murase | |
| 2009/0307388 A1 | 12/2009 | Tchapda | |
| 2010/0011154 A1 | 1/2010 | Yeh | |
| 2010/0030809 A1 | 2/2010 | Nath | |
| 2010/0080237 A1 | 4/2010 | Dai et al. | |
| 2010/0088469 A1 | 4/2010 | Motonaga et al. | |
| 2010/0115206 A1 | 5/2010 | de la Iglesia et al. | |
| 2010/0115211 A1 | 5/2010 | de la Iglesia et al. | |
| 2010/0122020 A1 | 5/2010 | Sikdar et al. | |
| 2010/0125857 A1 | 5/2010 | Dommeti et al. | |
| 2010/0169544 A1 | 7/2010 | Eom et al. | |
| 2010/0174939 A1 | 7/2010 | Vexler | |
| 2011/0047347 A1* | 2/2011 | Li et al. | 711/209 |
| 2011/0258362 A1 | 10/2011 | McLaren et al. | |
| 2012/0198176 A1 | 8/2012 | Hooker et al. | |

OTHER PUBLICATIONS

Stolowitz Ford Cowger Listing of Related Cases, Feb. 7, 2012.

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet; <URL:http://technet.microsoft.com/en-us/library/bb742613.aspx#mainSection>.

* cited by examiner

ALIGNMENT ADJUSTMENT IN A TIERED STORAGE SYSTEM

This application claims priority to U.S. Provisional Application Ser. No. 61/237,930, filed Aug. 28, 2009 which is herein incorporated by reference in its entirety.

BACKGROUND

Block-level storage in a disk storage array is organized as volumes of Logical Units (LU). Servers often access the disk storage array volumes as blocks where each storage address is associated with 512 bytes of data.

A proxy is a device that acts as an intermediary among two or more devices. Proxies can improve performance, load balancing, management, or add new functionality. A Storage proxy might abstract storage accesses into different data block sizes than the servers. For example, the server may access data in 512 byte blocks where the proxy may access data in 4 thousand byte (KB) blocks. These different block sizes may reduce proxy efficiency.

DETAILED DESCRIPTION OF THE DRAWINGS

Several preferred examples of the present application will now be described with reference to the accompanying drawings. Various other examples are also possible and practical. This application may be exemplified in many different forms and should not be construed as being limited to the examples set forth herein.

Figure 1:
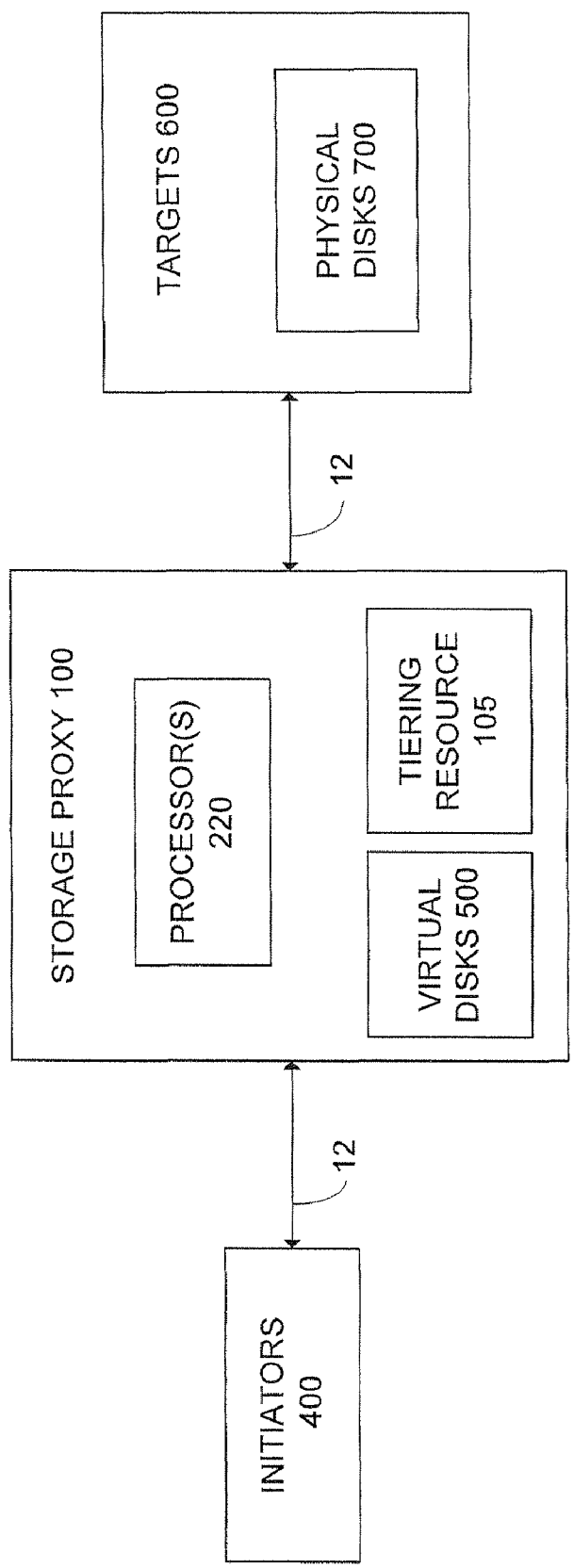
FIG. 1 is a block diagram showing a storage proxy coupled between initiators and targets.

FIG. 1 shows a storage proxy 100 connected between initiators 400 and targets 600. The initiators 400 can be any device or software application that writes and reads data to and from another device. In some embodiments, the initiators 400 are servers, server applications, routers, switches, client computers, personal computers, Personal Digital Assistants (PDA), or any other wired or wireless computing device that needs to access the data in targets 600. In one embodiment, the initiators 400 may be stand-alone appliances, devices, or blades.

The targets 600 can be any device that stores data that is accessed by another device, application, software, initiator, etc. In some embodiments, the targets 600 are storage devices or storage servers that contain storage media such as solid state memory and/or storage disks. In one embodiment, the targets 600 may also contain multiple storage disks that are referred to generally as a disk array.

Targets 600 may be thought of as any entity that receives and satisfies storage operations such as reads and writes to storage media. The disks or devices serving as the physical storage media may be local, remote or abstracted through another target in such a manner that initiators 400 need only have knowledge of targets 600 to access the storage. Likewise, initiators 400 may be thought of as any entity that issues storage operations. In one embodiment, targets 600 present a virtualized representation of physical disks 700 such that initiators 400 have no direct knowledge of the size or configuration of physical disks 700.

The applications or servers actually using the storage data may be abstracted or proxied (such as under an operation system or virtualized environment respectively) in such a manner that targets 600 only have knowledge of initiators 400.

The storage proxy 100 could be hardware and/or software located in a storage appliance, wireless or wired router, gateway, firewall, switch, or any other computer processing system. The storage proxy 100 provides an abstraction of physical disks 700 in targets 600 as virtual disks 500. In one embodiment, the physical disks 700 and the virtual disks 500 may be identical in size and configuration. In other embodiments the virtual disks 500 could consist of stripes of data or volumes of data that extend across multiple different physical disks 700.

The initiators 400, storage proxy 100, and targets 600 can be directly connected, or connected to each other through a network or storage fabric 12. Different communication protocols can be used over storage fabric 12 between initiators 400 and targets 600. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE) and others.

In some embodiments, the initiators 400, storage proxy 100, and targets 600 are each coupled to each other via wired or wireless Internet connections 12. In other embodiments, the initiators 400 may be a processor or applications in a personal computer or server that accesses one or more targets 600 over an internal or external data bus. The targets 600 in this embodiment could be located in the personal computer or server 400, or could also be a stand-alone device coupled to the computer/initiators 400 via a computer bus or packet switched network connection.

The initiators 400 conduct different storage operations with the physical disks 700 in targets 600 though the storage proxy 100. The storage operations may include write operations and read operations that have associated storage addresses. These interactions with storage proxy 100 and other components of storage proxy 100 may be normalized to block-level operations such as "reads" and "writes" of an arbitrary number of blocks. The storage proxy 100 contains one or more processors 220 and contains or connects to a tiering resource 105 that contains different combinations of Flash memory and Dynamic Random Access Memory (DRAM) that may have faster access speeds than the physical disks 700 in targets 600.

The processor 220 receives read and write operations from the initiators 400 that are directed to particular storage volumes in targets 600. If data for a read request is currently stored in the tiering resource 105, the storage proxy 100 provides the data back to the initiators 400. If the tiering resource 105 does not contain the requested data, the storage proxy 100 forwards the read request to the targets 600. The data obtained from targets 600 is then forwarded back through the storage proxy 100 to the initiators 400.

Storage Mapping

The storage proxy 100 may map block addresses or ranges of block addresses for storage access requests from initiators 400 to block addresses in the tiering media 105. For example, the initiators 400 may perform read and write operations in 512 byte increments and the storage proxy 100 may perform read and write operations to tiering media 105 in 4 KB block increments. The storage proxy 100 maps the 512 byte block addresses used in virtual disks 500 to one of the 4 KB block addresses used for storing and reading data blocks in the tiering media 105. Storage Proxy 100 may have the physical ability to address virtual disks 500 using a 512 byte block size but chose to use a larger block size (such as 4 KB) to reduce internal resource requirements.

As mentioned above, the storage proxy 100 receives a storage access request from the initiator 400 and determines if the data associated with the storage access request is located in the tiering media 105. If the data is not currently located in the tiering media 105, the storage proxy 100 forwards the storage access request to the storage target 600. The storage target 600 writes or reads the data associated with the storage access request. For read operations, the data is sent from the target 600 back to the storage proxy 100. The storage proxy 100 then forwards the data back to the initiator 400. For write operations, the storage proxy 100 may also store the data in the tiering media 105 while also forwarding the write operation to target 600.

If the data associated with the storage access request is currently located in the tiering media 105, the storage proxy 100 provides the data from tiering media 105 back to the initiator 400. The storage proxy 100 might also copy additional data from storage targets 600 into tiering media 105 responsive to any current or anticipated storage request from the initiator 400. For example, the storage proxy 100 may prefetch data into tiering media 105 based on a time of day, monitored storage access patterns from initiator 400, storage access request size, etc. Storage proxy 100 may also copy data from storage targets 600 into tiering media 105 based on administrative control independent of any actions of initiators 400.

Figure 2:
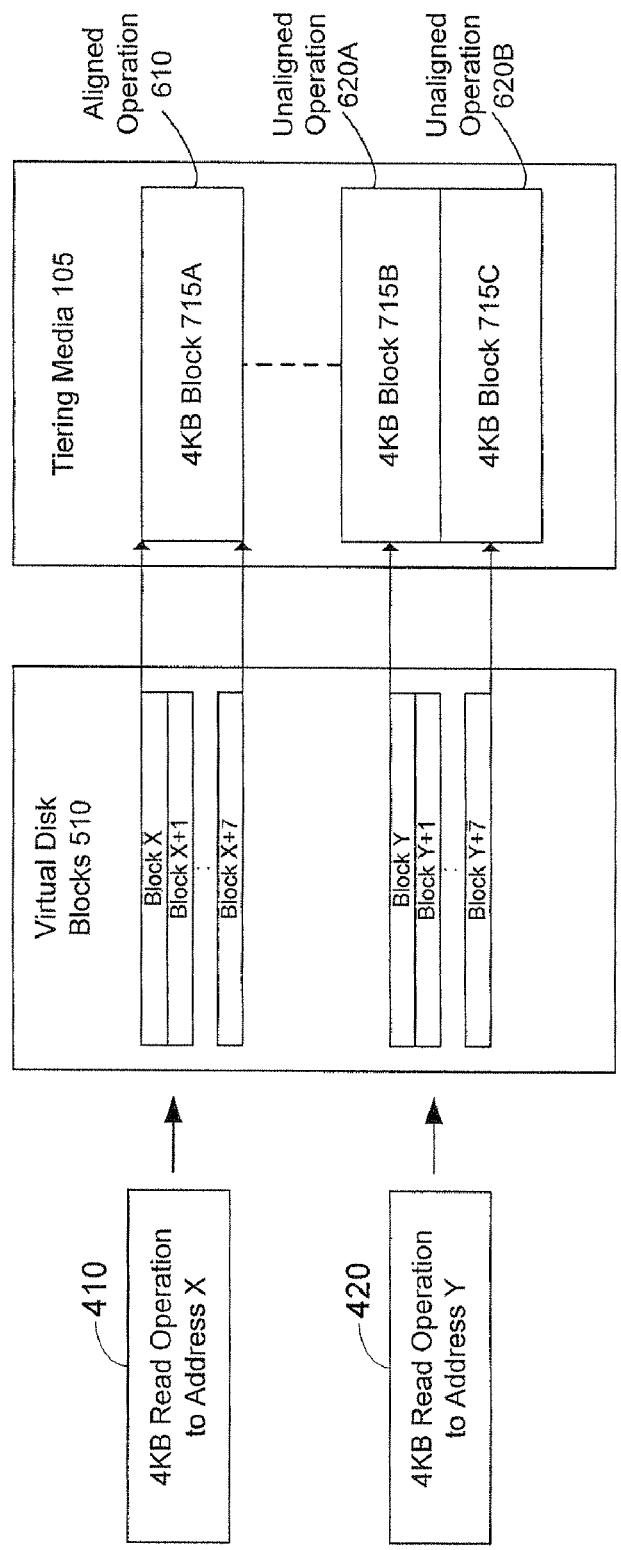
FIG. 2 is a block diagram showing alignments between data blocks on virtual disks and data blocks in a tiering media.

Referring to FIG. 2, the storage proxy 100 may store data in tiering media 105 in 4 KB blocks 715, instead of in the 512 byte blocks used in the storage access requests 410 and 420 from the initiator 400. A read operation 410 of 4 KB requires reading eight 512 byte blocks from virtual disk blocks 510 but may only require the storage proxy 100 to perform a single 4 KB block read from tiering media 105 or physical disks 700 in target 600. The initiator 400 has the responsibility of managing the 512 byte virtual disk blocks 510 and storage proxy 100 has the responsibility of managing the 4 KB data blocks 715 in the tiering media 105. Thus, the storage proxy 100 only has to manage one eighth (12.5%) of the number of data blocks as compared to the 512 byte block size of virtual disks 500. Management of virtual disks blocks as tiering resources can present a significant load on processors 220 within storage proxy 100.

Using larger 4 KB blocks increases the efficiency of storage proxy 100 since a single sequential 4 KB read operation to targets 600 or tiering media 105 may be faster than eight separate 512 byte read operations. The storage proxy 100 may also require less processing bandwidth and less memory for monitoring, tracking, and managing a fewer number of larger 4 KB blocks compared with smaller 512 byte blocks.

One automated scheme for determining a particular block size to use in the tiering media 105 is described in co-pending U.S. patent application Ser. No. 12/605,119 filed on Oct. 23, 2009 and Ser. No. 12/605,160 filed on Oct. 23, 2009 which are both herein incorporated by reference. Alternatively, a system administrator can configure the storage proxy 100 to operate with a particular block size.

One drawback to this mapping scheme is that multiple 4 KB block operations may be needed if the 512 byte blocks 510 in virtual disk blocks 510 do not align with the addresses of the 4 KB blocks 715 in tiering media 105. Since the blocks 715 in tiering media 105 are larger, additional 4 KB storage accesses can substantially reduce performance of the storage proxy 100.

To illustrate further FIG. 2 shows two read operations 410 and 420 from initiator 400 that each request 4 KBs of data but result in different accesses to data blocks 715 in tiering media 105. The 4 KB read operation 410 received from initiator 400 requests eight 512 byte virtual disk blocks X through X+7. The address for the read operation 410 just happens to be aligned with the starting address of 4 KB data block 715A in tiering media 105. For example, the address X for the first 512 byte block in read operation 410 maps to the starting address of the 4 KB block 715A. Therefore the storage proxy 100 can perform a single 4 KB read operation 610 of data block 715A in tiering media 105 and provide all of the data associated with read operation 410.

Contrasting this is 4 KB read operation 420 from initiator 400 that also accesses eight 512 byte blocks at addresses Y–(Y+7). However, the block addresses Y-(Y+7) are not aligned with any of the 4 KB blocks in tiering media 105. For example, the starting address Y of read operation 420 is not the starting address for one of the data blocks 715 in tiering media 105. Some of the virtual blocks 510 are therefore located in data block 715B and some of the virtual blocks 510 are located in 4 KB data block 715C. This unaligned block mapping requires the storage proxy 100 to perform two separate read operations 620A and 620B that read both 4 KB data block 715B and data block 715C, respectively.

If any one of the 512 byte blocks at addresses Y through Y+7 is located in a 4 KB block 715 in tiering media 105, the entire 4 KB data block has to be read. In this example, the addresses for the 512 byte blocks Y through Y+7 extend across two different 4 KB blocks 715B and 715C. Thus, 8 KBs of data have to be read from tiering media 105 in operations 620A and 620B for an initiator read operation 420 that only requests 4 KB of data.

Performance of the storage proxy 100 is reduced since it takes longer to read 8 KB of data than 4 KB of data. The storage proxy 100 accepts the performance penalty since physical disks 700 in targets 600 and data in tiering media 105 are not accessed in block sizes less than 4 KB. It is possible for tiering media 105 to use a smaller block size than physical disks 700 however this is typically not practiced since management of different physical block sizes in the tiering media 105 and physical disks 700 creates additional performance penalties. It is also possible that the 4 KB blocks 715B and 715C are not physically sequential within tiering media 105. This would occur if an indirection mechanism is used to allocate, map and eventually recover tiering resources over time. In this case, the performance penalty associated with retrieving the two blocks is substantial as each represents a random access.

Figure 3:
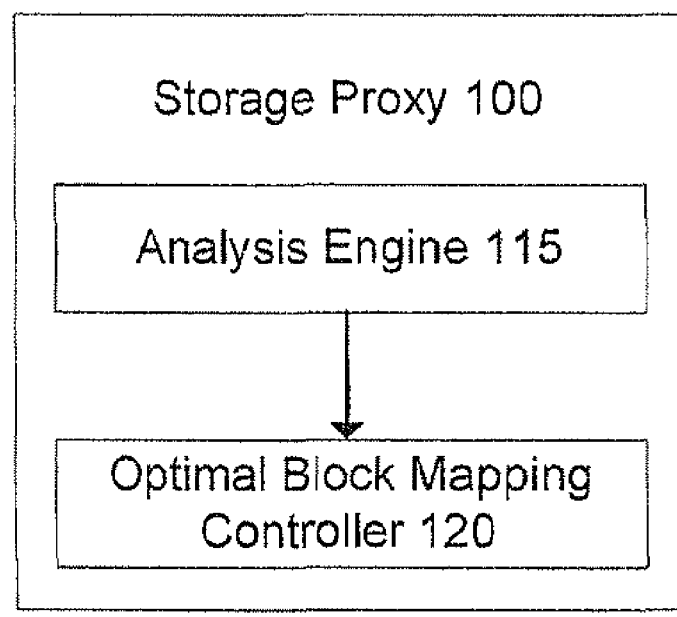
FIG. 3 is a block diagram showing the storage proxy of FIG. 1 in more detail.

FIG. 3 shows an analysis engine 115 and optimal block mapping controller 120 used in the storage proxy 100 for overcoming some of the alignment penalties described above. The analysis engine 115 examines the stream of storage operations from initiators 400 and identifies different alignments for different block sizes. For example, there are eight different possible 512 byte alignments for a 4 KB read operation, sixteen 512 byte alignments for an 8 KB read operation, thirty two different 512 byte alignments for a 16 KB read, etc.

The number of occurrences of each alignment for each read size are recorded over a sampling period. The sampling period could be for any programmable duration or programmable number of read operations. The analysis engine 115 identifies a dominant read operation alignment during the sampling period. The mapping controller 120 then maps data into the tiering media 105 to remove the dominant alignment offset between the read operations and the data blocks in the tiering media For example, most of the read operations may start at the third 512 byte address within a 4 KB data block in the tiering media 105. The mapping controller 120 directs the storage proxy 100 to start writing 4 KB data blocks into tiering media 105 at that third 512 byte address. Subsequent reads to the tiering media 105 are then more likely to be aligned with the realigned block boundaries in the tiering media 105. This means fewer blocks have to be read from the tiering media 105 to service the read operations from the initiators 400.

Also, fewer blocks may have to be invalidated for write operations in tiering media 105. For example, a 4 KB write operation that extends across two 4 KB data blocks 715 in tiering media 105 requires both 4 KB blocks to be invalidated and rewritten. If the data in tiering media 105 is remapped to the dominant alignment, fewer 4 KB blocks in tiering media 105 would likely have to be invalidated and rewritten with new data.

Figure 4:
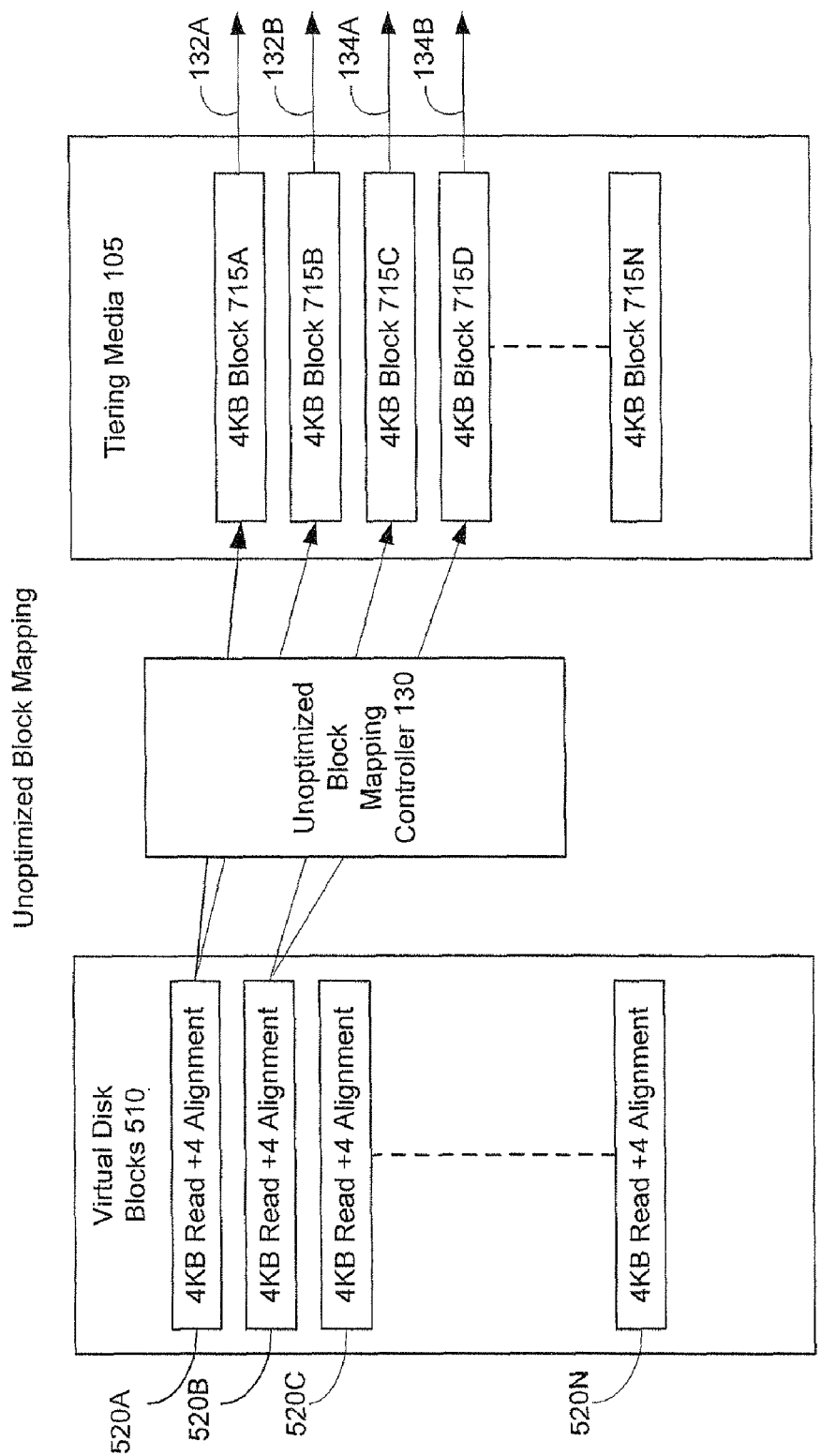
FIG. 4 is a block diagram showing an un-optimized block mapping.

FIG. 4 shows a series of 4 KB read operations 520 received by the storage proxy 100 from the initiators 400 in FIG. 1. The storage proxy 100 determines that the 4 KB read operation 520A has a +4 alignment with the 4 KB data block 715A in tiering media 105. In one example this means that the starting address of read operation 520A maps to the fourth 512 byte location within 4 KB block 715A. In this example, data block 715B contains the last four 512 bytes of data for the 4 KB read request 520A. While the two data blocks 715A and 715B are shown in contiguous address ranges, it is also possible that the second data block 715B is located in another address location within tiering media 105.

Because of the +4 alignment, the address range for the 4 KB read operation 520A extends from data block 715A over to data block 715B. Therefore the storage proxy 100 needs to conduct two read operations 132A and 132B to supply the data for read operation 520A.

Other 4 KB read operations 520B, 520C, and 520N received from the initiators 400 also have similar +4 alignments with 4 KB data blocks 715 in tiering media 105. For example, the starting address for read operation 520B starts at the fourth 512 byte address location within 4 KB block 715C. Because of the +4 alignment, the storage proxy 100 has to read 4 KB data block 715C in operation 134A and read 4 KB data block 715D in operation 134B to obtain the 4 KBs of data requested in read operation 520B. Some of the other read requests 520C and 520N received from the initiators 400 also have the same +4 alignment with the data blocks 715 in tiering media 105. If read operations 520A and 520B had been sequential in address space, the resulting tiering media accesses would have read block 715B twice as the first half satisfies the end of read operation 520A and the second half satisfies the beginning of read operation 520B.

Figure 5:
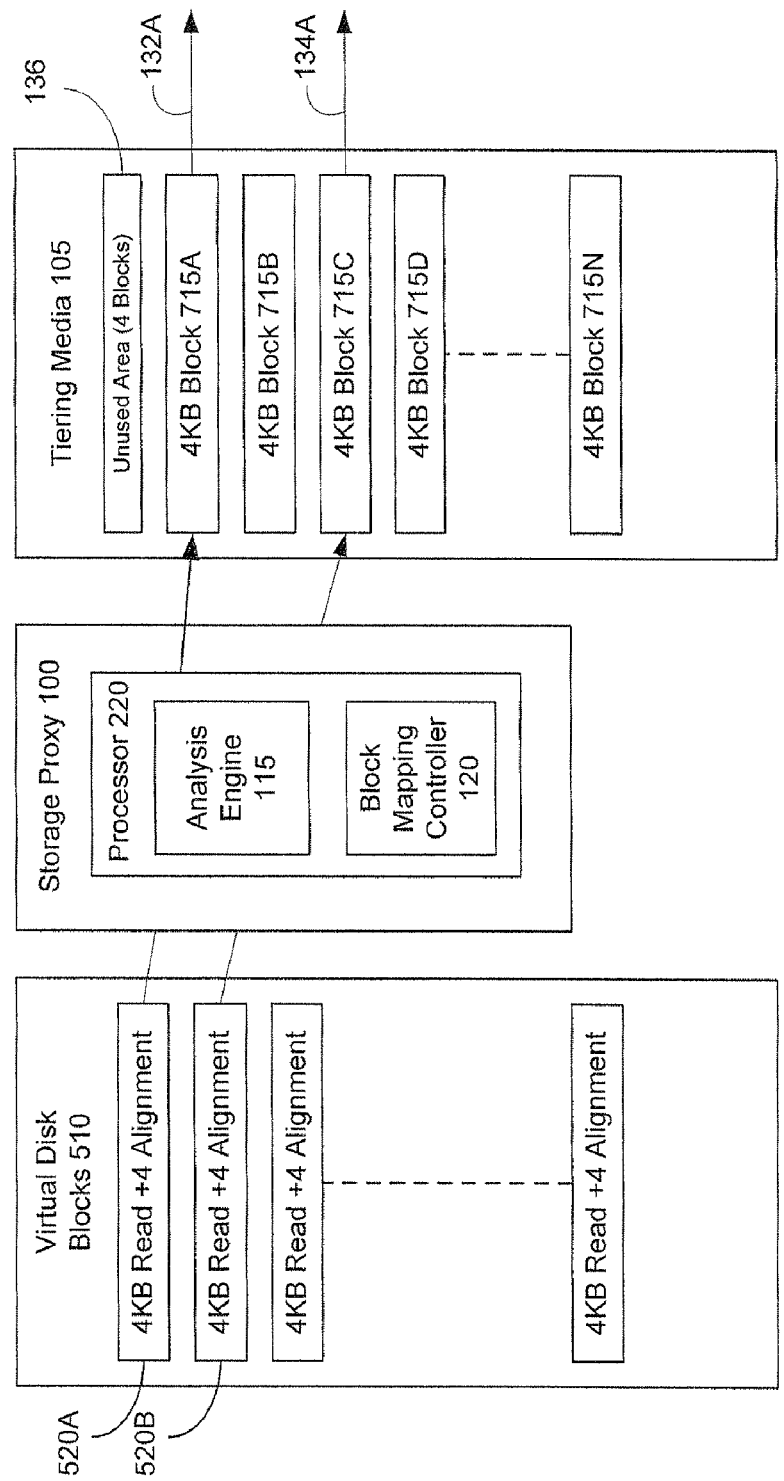
FIG. 5 is a block diagram showing an optimized block mapping.

FIG. 5 shows how the analysis engine 115 in FIG. 3 identifies the dominant alignments between the addresses in read operations 520 and the addresses in the corresponding data blocks 715 in tiering media 105. Examples below refer to accesses to blocks 715 the tiering media 105. However, the mapping scheme described below may also be used for the targets 600 or any other storage accessed by the storage proxy 100 for servicing storage access requests.

The analysis engine 115 in FIG. 3 determines the dominant alignments by first identifying the difference between the starting address of the read operations 520 and the starting address location of the first data block 715 containing data for the read operations 520. In the example above, an address difference of four 514 byte address locations corresponds to an alignment of +4.

The analysis engine 115 also counts the number of instances for each alignment. For example, the analysis engine 115 counts the number of times each 0, +1, +2, +3, +4, +5, etc. alignment is identified for the read operations 520. The alignment with the highest count value within some given threshold is selected as the dominant alignment. In this example, the dominant alignment is identified as +4.

The block mapping controller 120 then maps subsequent data into the tiering media 105 according to the dominant alignment. For example, the block mapping controller 120 may first invalidate all of the data currently residing in tiering media 105. This is possible since all of the data residing in tiering media 105 is a copy of data also residing in targets 600. The block mapping controller 120 in this example writes the first data block 715A into the fourth 512 byte address location in tiering media 105. All other data blocks 715 are similarly offset by four 512 byte address locations. For example, a next data block 715B may be stored in the next 4 KB address location in tiering media 105 after the end of data block 715A. Therefore, the starting address of data block 715B is also offset by four 512 byte address locations. Other data blocks 715 are subsequently stored in +4 aligned 4 KB address locations in tiering media 105 according to what tiering operations need to be performed.

The new mapping creates an unused address space 136 at the beginning of tiering media 105 of four 512 block addresses. This new optimal block mapping by controller 120 offsets, shifts, aligns etc. more of the addresses in storage operations 520 with the starting addresses of data blocks 715 in tiering media 105. In practice, a strong majority of storage operations 520 may have the same alignment and it is likely that the mapping created by analysis engine 115 and controller 120 will result in the alignment for a majority of read operations 520.

The four 512 byte address offset (2 KB) in the unused area 136 in FIG. 5 causes the 4 KB data blocks 715 in tiering media 105 to align with the starting addresses for at least some of the read operations 520. For example, the starting addresses for the first data block 715A is now aligned with the starting address for read operation 520A. Thus, the processor 220 in storage proxy 100 can service read operation 520A with a single read 132A of data block 715A. Similarly, the processor 220 can service read operation 520B with a single read 134B of data block 715C. An 8 KB read operation 520 would now likely only require two 4 KB reads to tiering media 105, instead of possibly three 4 KB reads to tiering media 105.

The storage proxy 100 in FIG. 5 now can service the read operations 520 from the initiators 400 with a few number of data blocks 715. Therefore, the storage proxy 100 can service read requests 520 faster and use storage space in the tiering media 105 more efficiently.

Other types of mapping can also be used. For example, instead of adding four unused 512 byte address locations to the beginning of the tiering media 105, the block mapping controller 120 could subtract four 512 byte address locations from the virtual address used for virtual disk blocks 510. This has the same effect of offsetting the previous +4 alignment offset between the read operations 520 and the data blocks 715 in tiering media 105. Other mapping techniques could also be used to offset the alignment offsets between the read operations and data blocks in tiering media 105.

Figure 6:
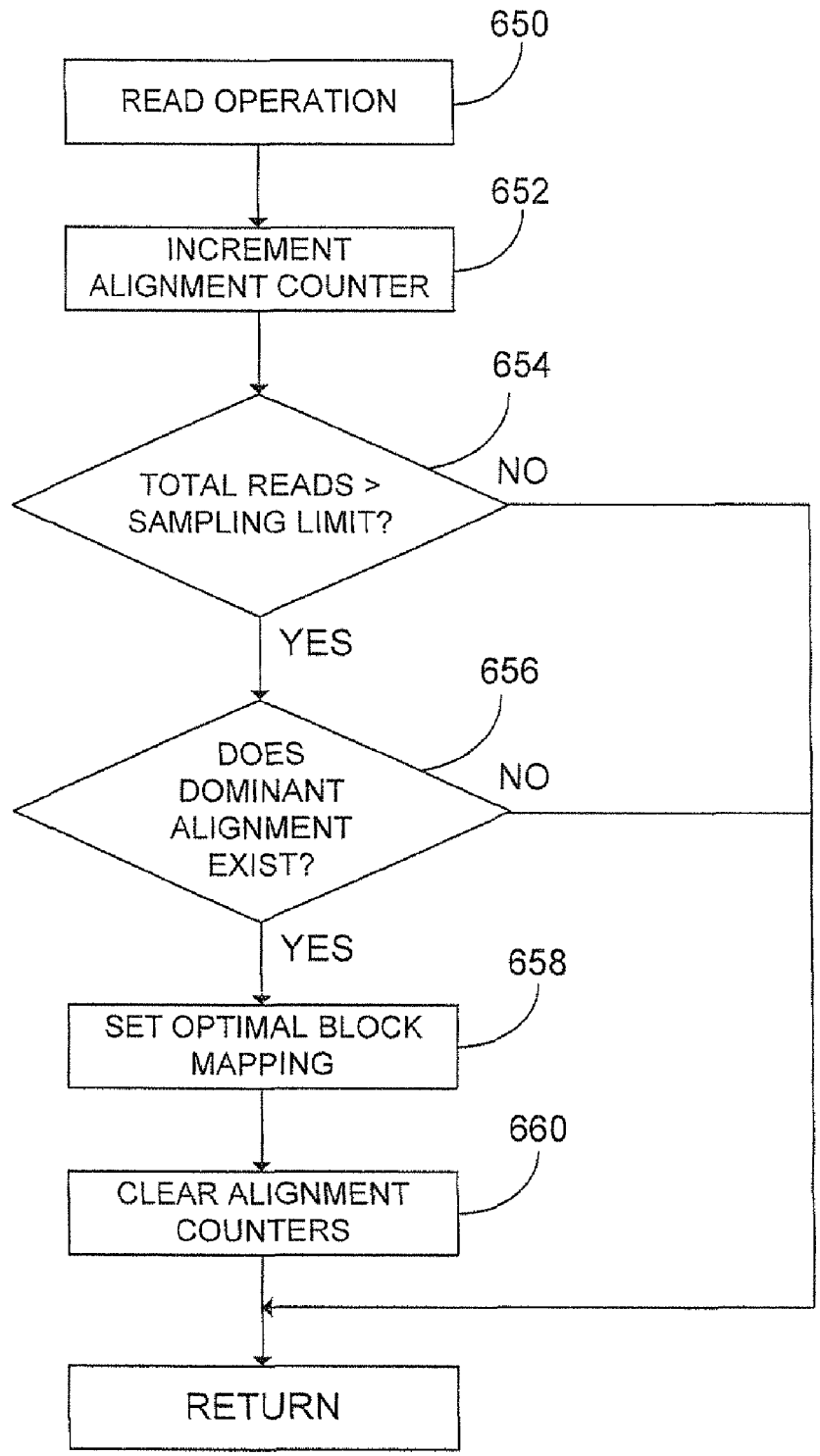
FIG. 6 is a flow diagram showing how the storage proxy improves block mapping.

FIG. 6 is a flowchart describing the mapping optimization in more detail. The analysis engine 115 in storage proxy system 100 receives the read requests from the initiators 400 in operation 650. The analysis engine 115 compares the addresses of the read requests with the starting addresses of the data blocks in tiering media 105 that contain the data for the read requests. In the example above, the analysis engine 115 identifies the number of 512 byte address locations between the starting address of the first 4 KB block 715 and the starting address of the read operation. Of course addressing schemes other than 512 byte and 4 KB addresses can also be used.

The analysis engine 115 in operation 654 determines if the total number of read operations 520 in FIG. 5 is above a predetermined sampling limit. If not, the analysis engine 115 continues to count the read alignments in operations 650 and 652. Alternatively, the sampling may continue for some predetermined time period.

Figure 7:
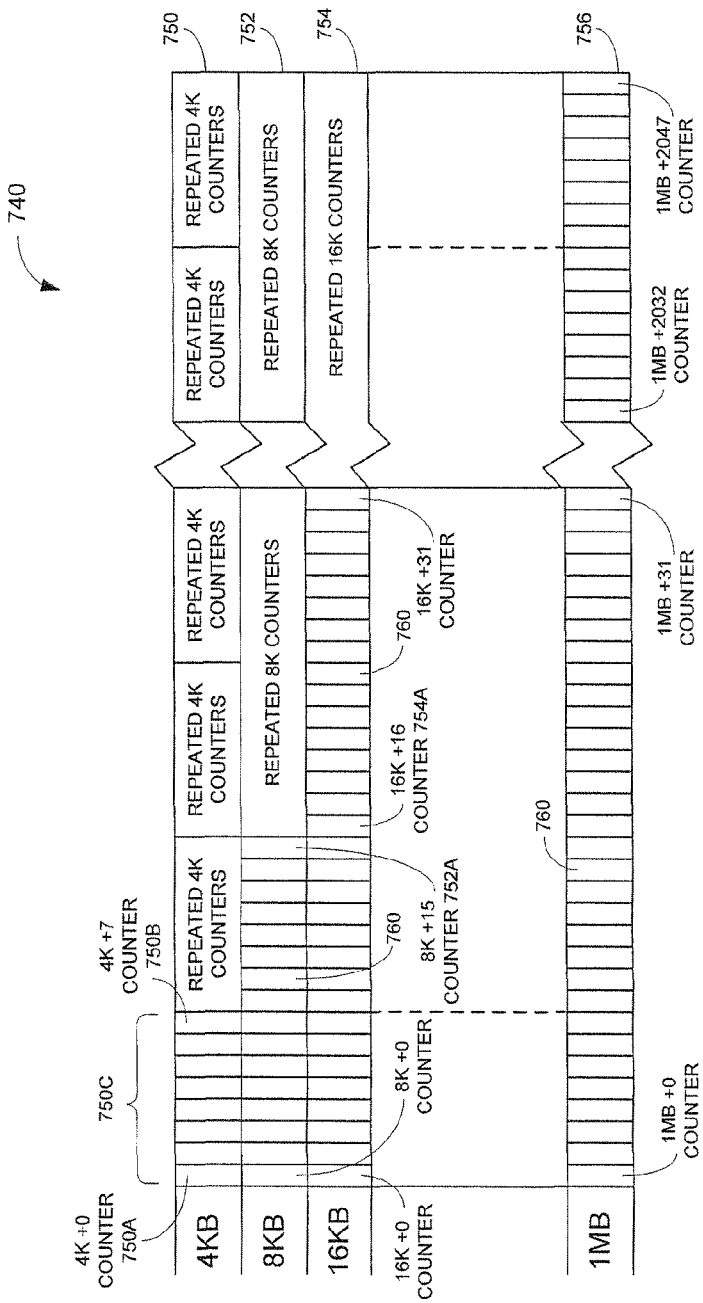
FIG. 7 is a diagram of a counter array used for identifying a dominant block alignment.
Figure 8:
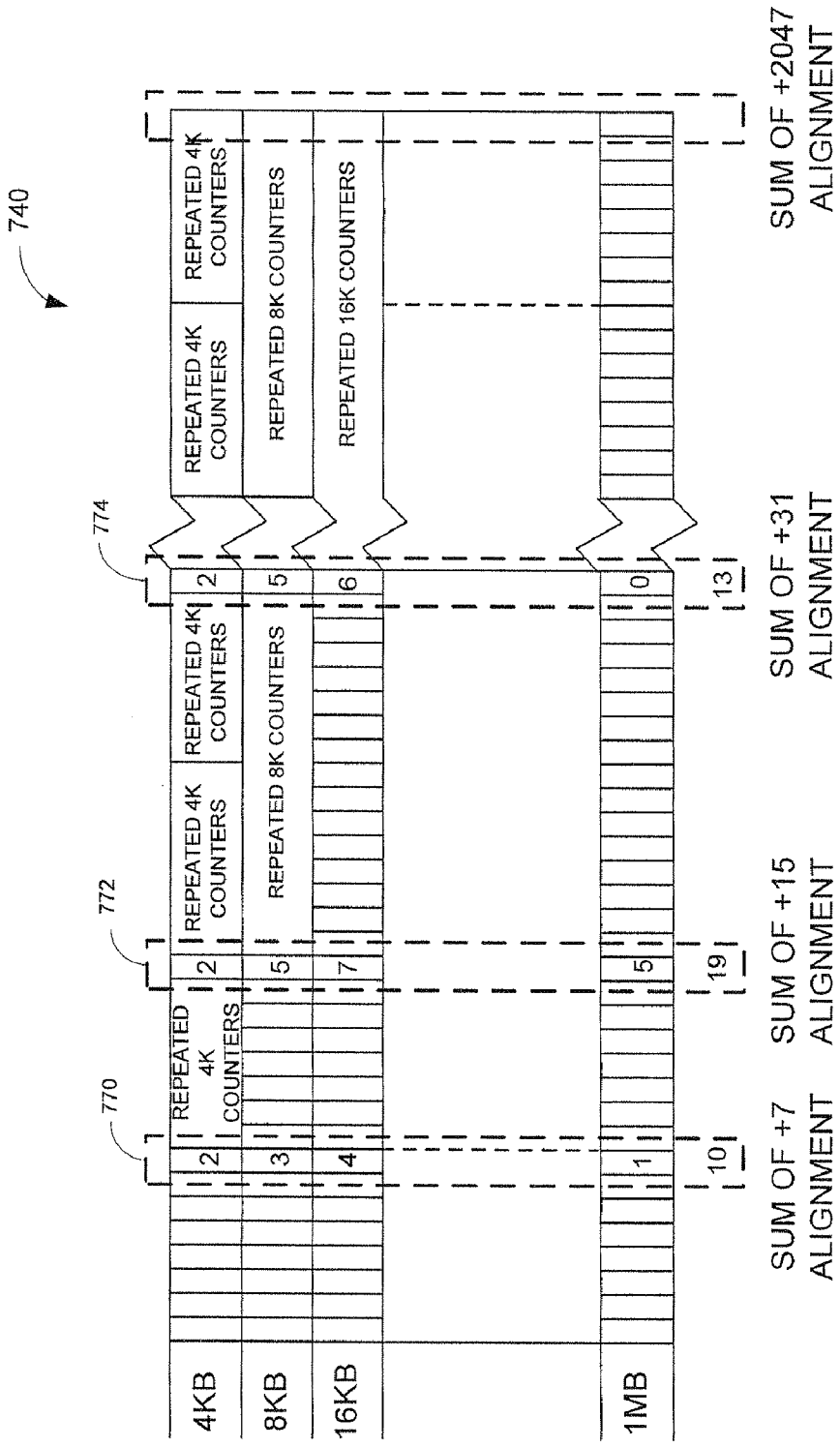
FIG. 8 shows an example of how the counter array of FIG. 7 is used to identify the dominant block alignment.

After a predetermined number of reads have been monitored, the analysis engine 115 in operation 656 determines which of the alignment counters has the highest count value. In the example above, the +4 alignment counter had the highest count value. There could be different criteria for determining the dominant alignment other than simply the highest count value. For example, one alignment counter may have to be a certain percentage greater than the next highest alignment counter, or may have to be a certain percentage greater than the previously determined dominant alignment, in order to qualify as a new dominant alignment in operation 656. If no dominant alignment is identified in operation 656, the analysis engine 115 continues to monitor the read alignments in operations 650 and 652. One example of the selection of a dominant alignment from a set of alignment counters is shown in FIG. 7 and FIG. 8 and discussed subsequently.

When a new dominant alignment is identified, the analysis engine 115 in operation 658 sets the optimal block mapping used by the block mapping controller 120. For example, a new dominant alignment of +4 causes the storage proxy 100 to first clear or invalidate the data in tiering media 105. The mapping controller 120 then starts copying data blocks 715 (FIG. 5) from targets 600 back into the tiering media 105 starting at the fourth 512 byte block address. This effectively established the unused area 136 in FIG. 5. The alignment counters are cleared in operation 660 and normal tiering operations continue in the tiering media 105 at the new +4 alignment.

The optimal block mapping can be automatically and continuously reset for the latest observed dominant alignments. Otherwise, a particular alignment may be statically set either by a system administrator or automatically by the analysis engine 115 at system startup or periodically during operation.

Different dominant alignments can be identified for different address ranges and the optimal block mapping individually set for each of the different address ranges. For example, there may be different alignment counters used for each 100 gigabytes of virtual memory and an alignment and optimal mapping identified and set for each 100 gigabytes of virtual disk blocks 510 in virtual disks 500.

In yet another embodiment, the analysis engine 115 may compare the calculated dominant alignment with a previously determined dominant alignment for a last time period or last sampling limit. If the number of read operations associated with the new dominant alignment is greater than the number of read operations associated with the previous alignment, the new dominant alignment will be used. If the number of read operations associated with the previous dominant alignment value is larger, the analysis engine 115 may continue using the previous dominant alignment until another larger dominant alignment value is identified. This can reduce the number of times the data blocks need to be remapped into the tiering media 105 from the storage targets 600.

The read operations 520 described above could be any abstracted read operation initiated by the initiators 400 in FIG. 1. For example, the read operations 520 could be the original application reads sent by a software application operating in initiators 400. The read operations 520 could alternatively be the fiber channel reads issued over the network 12 in FIG. 1 that the storage proxy 100 receives over a particular network or fiber interface card. Techniques for distinguishing these different read abstractions is described in detail in copending U.S. patent application Ser. No. 12/846,568 filed on Jul. 29, 2010 which is herein incorporated by reference.

FIG. 7 shows an array of counters 740 used for identifying a dominant data alignment in the tiering media 105. A first row of counters 750 is associated with a 4 KB read size, a second row of counters 752 is associated with an 8 KB read size, a third row of counters 754 is associated with a 16 KB read size, etc. up to a row of counters 756 associated with a 1 MB read size. In this example, each lower row of counters corresponds with read operations requesting a block of contiguous data that is a power of two larger than the previous row. However, any number of counter rows and any read size divisions can be used. The counter rows can also extend to read sizes that are larger than 1 MB.

Each individual counter 760 represents the number of occurrences of a particular 512 byte alignment for a particular read size. For example, counter 750A represents a zero 512 byte address offset (+0) for 4 KB read operations, and counter 750B represents a +7 512 byte address alignment for 4 KB read operations. There are eight counters 750C for each of the eight 512 byte alignments possible for a 4 KB read. There are sixteen counters 752 for the sixteen 512 byte alignments possible for an 8 KB read, thirty two counters 754 for 16 KB reads, etc.

The 512 byte address alignments and their associated counters are used because existing storage systems generally access data in 512 byte increments. However, the counters could be associated with any read operation address data size, including 1024 byte addresses, or some other smaller or larger data address increment used by the storage system.

The analysis engine 115 in FIGS. 5 and 6 receives read operations from the initiators 400 in FIG. 1. The counters in counter array 740 are incremented according to the size and associated alignment of the read operations. For example, the counter 750A is incremented whenever there is a 4 KB read operation that has an alignment of +0. The counter 752A is incremented whenever there is an 8 KB read operation that has an alignment of +15, and the counter 754A is incremented whenever there is a 16 KB read operation that has an alignment of +16.

The values in each row of counters for a particular read size are used in combination with the values in the counters for other read sizes to determine the one optimal/dominant alignment for all different read sizes. For example, the alignments for the 4 KB read counters 750 are a multiple of two of the 8 KB read counters 752 and a multiple of four of the 16 KB counters 754. Thus an alignment of +15 for an 8 KB read will also align with the +7 alignment of a 4 KB read.

Said another way, mapping data blocks 715 in tiering media 105 fifteen 512 byte block addresses to align with 8 KB read operations having a +15 alignment will also align the data blocks 715 with 4 KB read operations having a +7 alignment. Similarly, shifting the data blocks 715 for 16 KB reads having a +31 alignment will also align the data blocks with 8 KB read operations having a +15 alignment, and will also align the data blocks with 4 KB read operations with a +7 alignment.

However, aligning data blocks for a +7 4 KB read operation does not align the data blocks with +15 8 KB reads, +31 16 KB reads, etc. The +7 4 KB read alignment will only align with the +7 8 KB read, +7 16 KB read, etc.

Thus, the alignment in smaller read sizes can be repeated for the same relative position in larger read sizes. For example the values in counters 750C for 4 KB reads can be used in conjunction with the values in each subsequent set of eight counters for 8 KB reads, 16 KB reads, etc. Similarly, the alignment values in the sixteen counters 752 for the 8 KB reads an also be used with each subsequent set of sixteen counters for 16 KB reads, 32 KB reads, etc. This takes into account the additional smaller read sizes that will also be aligned with a larger read size alignment.

The term repeated in FIGS. 7 and 8 refers to the same values in the counters being used for determining other dominant alignments for other larger read sizes. For example, the counter values in the eight counters 750 for the 4 KB read size are also used when calculating the +8 through +2047 alignments for the other larger read sizes. Thus, only eight counters 750 have to be used with all of the other read sizes. This is explained in more detail below in FIG. 8.

FIG. 8 explains in more detail how counter values are summed together for each alignment. The analysis engine 115 sums together the values in each of the +7 counters 770 for each of the read sizes 4 KB, 8 KB, 16 KB, etc. For example, the values in +7 counters 770 for 4 KB, 8 KB, 16 KB, and 1 MB may be 2, 3, 4, and 1, respectively. The additional values for the read sizes between 16 KB and 1 MB are left out for simplicity. The total +7 alignment value is therefore 10.

The values in +15 counters 772 for 4 KB, 8 KB, 16 KB, and 1 MB are 2, 5, 7, and 5, respectively. The total +15 count value is therefore 19. Note that the number of +7 alignments for 4 KB reads is 2 and is repeated for the +15 alignment since a data block mapped for +15 storage access alignments will also align with +7 4 KB reads.

The values in +31 counters 774 for 4 KB, 8 KB, 16 KB, and 1 MB are 2, 5, 6, and 0, respectively. The total +31 alignment value is therefore 13. Note that the +7 alignment value for 4 KB reads and the +15 alignment value for 8 KB reads are also repeated for the +31 alignment since data blocks shifted for a +31 alignment will also align with +7 4 KB reads and +15 8 KB reads. Since the sum of the counters 772 for the +15 alignment has a highest value of 19, the dominant alignment is determined to be +15.

Accordingly, the mapping controller 120 in FIG. 5 invalidates the tiering media 105 and starts copying data from the targets 600 into the tiering media 105 starting at the fifteenth 512 byte address location. In other words, the first fifteen 512 byte addresses in tiering media 105 are not used. Any previous 4 KB reads that had a +7 alignment and any 8 KB, 16 KB, or 1 MB reads that previously had a +15 alignment will now all be aligned with the start of the 4 KB data blocks in the tiering media 105

An alternative embodiment may not have separate counters for different read sizes. For example, there may only be 32 counters for thirty two different 512 byte alignments. The thirty two counters are incremented according to the associated alignments, regardless of the size of the read operation.

The analysis engine 115 identifies the dominant alignment as the highest value in the 32 counters. The analysis engine 115 could perform additional pattern analysis on the values in the thirty two counters to identify the dominant alignment. For example, larger count values for every eighth counter may indicate a dominant alignment associated with 4 KB read operations.

The usage of optimal block mapping is made possible by the use of tiering media 105 within storage proxy 100. Because the storage proxy 100 selectively copies data from physical disks 700 into tiering media 105, the block mapping and alignment can be changed dynamically by invalidating the tiered data and reloading data from physical disks 700 using the dominant alignments. This may not be possible with direct storage where the alignments are fixed by the addressing scheme. The combination of tiering media 105 and the dynamic alignment scheme automatically improves storage proxy performance without requiring operator interaction.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A method, comprising:
monitoring storage access operations from initiators;
determining if data blocks for the storage access operations are located in a storage media;
forwarding the storage access operations to a storage target when the data blocks for the storage operations are not located in the storage media;
identifying address alignments between the storage access operations and the data blocks in storage media for different read sizes;
maintaining a count for each of the address alignments for each of the different read sizes for the storage access operations;
identifying a dominant one of the address alignments based on the count for each of the address alignments for each of the different read sizes;
clearing all data blocks in the storage media and copying new data blocks from the storage target into the storage media according to the dominant one of the address alignments.

2. The method of claim 1 further comprising:
selecting one of the address alignments with a largest number of storage access operations; and
using the selected one of the address alignments as the dominant one of the address alignments.

3. The method of claim 1 further comprising:
performing the clearing of all the data blocks in the storage media after identifying the dominant one of the address alignments;
mapping the new data blocks into the storage media according to the dominant one of the address alignments;
identifying new address alignments between subsequent storage access operations and the new data blocks in the storage media;
identifying a new dominant one of the new address alignments between the subsequent storage access operations and the new data blocks; and
mapping additional data blocks into the storage media according to the new dominant one of the new address alignments.

4. The method of claim 1 wherein the address alignments are in 512 byte increments.

5. The method of claim 1 wherein the storage access operations are performed on 512 byte address increments and the data blocks are stored in 4 thousand byte address increments.

6. The method of claim 1 further comprising:
tracking a first set of numbers for the address alignments having a first read size;
tracking a second set of numbers for the address alignments having a second read size; and
identifying the dominant one of the address alignments according to the first set and second set of numbers.

7. A method, comprising:
monitoring storage access operations;
identifying address alignments between the storage access operations and data blocks in a storage media;
identifying groups of the address alignments for different read sizes that provide a same alignment with the data blocks;
identifying one of the groups of address alignments with a highest number of the storage access operations;
using a largest one of the address alignments in the identified one of the groups as a dominant one of the address alignments; and
mapping new data blocks into the storage media according to the dominant one of the address alignments.

8. The method of claim 1 further comprising:
identifying when a number of the storage access operations reaches a sampling limit; and
identifying one of the address alignments associated with a largest number of the storage access operations after reaching the sampling limit; and
using the identified one of the address alignments as a current dominant one of the address alignments.

9. The method according to claim 8 further comprising:
identifying a number of storage access operations associated with a previous previously dominant one of the address alignments;
using the previously dominant one of the address alignments as the dominant one of the address alignments when the previously dominant one of the address alignments has more storage access operations than the current dominant one of the address alignments; and
using the current dominant one of the address alignments as the dominant one of the address alignments when the current dominant one of the address alignments has more storage access operations than the previously dominant one of the address alignments.

10. An apparatus, comprising:
at least one processor configured to:
identify different alignment offsets between starting addresses of read operations and starting addresses of locations of data blocks containing data for the read operations;
identify different read sizes for the read operations;
identify a number for each of the different alignment offsets for each of the different read sizes;
determine a preferred one of the different alignment offsets based on the number for each of the different alignment offsets for each of the different read sizes; and
store new data blocks into address locations in a storage device based on the preferred one of the different alignment offsets.

11. The apparatus of claim 10 further comprising counters configured to track the number of each of the different alignment offsets for each of the different read sizes.

12. The apparatus according to claim 10 wherein the processor is configured to align the new data blocks in the storage device according to one of the different alignment offsets associated with a highest number of the read operations.

13. The apparatus according to claim 11 wherein different sets of the counters are associated with each of the different alignment offsets for each of the different read sizes.

14. An apparatus, comprising:
at least one processor configured to:
store data blocks in a storage device using a first address block size;
receive storage access requests that use a second address block size;
identify alignment differentials between the first address block size and the second address block size;
use counters to track a number of the storage access requests for each of the alignment differentials, wherein different sets of the counters are associated with different read sizes; and
sum together values in each of the different sets of counters to identify a dominant one of the alignment differentials and map the data blocks into the storage device according to the dominant one of the alignment differentials.

15. An apparatus, comprising:
at least one processor configured to:
store data blocks in a storage device using a first address block size;
receive storage access requests that use a second address block size;
identify alignment differentials between the first address block size and the second address block size;
use sets of counters to identify the alignment differentials for different read sizes that provide a same alignment with the data blocks in the storage device;
sum values in each of the sets of counters;
identify one of the sets of counters having a largest one of the summed values;
use a largest one of the alignment differentials associated with the identified one of the sets of counters as a dominant one of the alignment differentials; and
aligning subsequent data blocks according to the dominant one of the alignment differentials.

16. A storage system, comprising:
a processor configured to:
operate as a storage proxy to store blocks of data from a storage device into a tiering media;
determine if the blocks of data for storage access requests are located in the tiering media;
forward the storage access requests to the storage device for the blocks of data not located in the tiering media;
identify address alignment offsets between the storage access requests and the blocks of data in the tiering media; and
copy new blocks of data from the storage device into the tiering media according to the address alignment offsets; wherein
the storage proxy includes:
an analysis engine configured to identify the address alignment offsets between the storage access requests and the blocks of data in the tiering media; and
maintain a count of each of the address alignment offsets for each of a plurality of different read sizes in the storage access requests.

17. The storage system according to claim 16 wherein the storage proxy includes an analysis engine configured to identify the address alignment offsets between the storage access requests and the blocks of data in the tiering media.

18. The storage system according to claim 17 wherein the storage proxy includes an array of counters that identify the address alignment offsets for different read sizes in the storage access requests.

19. The storage system according to claim 18 wherein the storage proxy includes a block mapping controller configured to copy the new blocks of data from the storage device into the tiering media according to a dominant one of the address alignment offsets.

* * * * *

UNITED STATES PATENT AND TRADEMARK OFFICE
CERTIFICATE OF CORRECTION

PATENT NO. : 8,402,246 B1
APPLICATION NO. : 12/869604
DATED : March 19, 2013
INVENTOR(S) : Erik de la Iglesia Page 1 of 1

It is certified that error appears in the above-identified patent and that said Letters Patent is hereby corrected as shown below:

In the Claims

In column 12, claim 9, line 58, before "previously dominant one of" delete "previous".

Signed and Sealed this
Thirty-first Day of December, 2013

Margaret A. Focarino
*Commissioner for Patents of the United States Patent and Trademark Office*